United States Patent [19]

Kulberg et al.

[11] 3,732,419
[45] May 8, 1973

[54] SCINTILLATION CAMERA WITH IMPROVED RESOLUTION

[75] Inventors: Gerardus H. Kulberg, Amstelveen, Netherlands; Gerd Muehllehner, Heidelberg, Germany

[73] Assignee: Nuclear-Chicago Corporation, Des Plaines, Ill.

[22] Filed: Oct. 12, 1970

[21] Appl. No.: 79,861

[52] U.S. Cl. ......250/71.5 S, 250/71.5 R, 250/83.3 R
[51] Int. Cl. ..............................................G01t 1/20
[58] Field of Search ....................250/71.5 R, 71.5 S, 250/83.3 R

[56] References Cited

UNITED STATES PATENTS

| | | | |
|---|---|---|---|
| 3,011,057 | 11/1961 | Anger | 250/71.5 S |
| 3,509,341 | 4/1970 | Hindel et al. | 250/71.5 S |

OTHER PUBLICATIONS

Anger, H.; "Sensitivity, Resolution . . . "; Univ. of Calif. Radiation Lab.; February, 1966; pp. 1-10 & FIG. 1b.

Primary Examiner—Archie R. Borchelt
Attorney—Lowell C. Bergstedt, Walter C. Ramm and Helmuth A. Wegner

[57] ABSTRACT

An Anger-type scintillation camera employing a threshold preamplifier at the output of each photomultiplier tube to eliminate the contribution of tubes distant from the location of each scintillation to the coordinate position signal, thereby improving the intrinsic resolution of the Anger-type detector.

13 Claims, 10 Drawing Figures

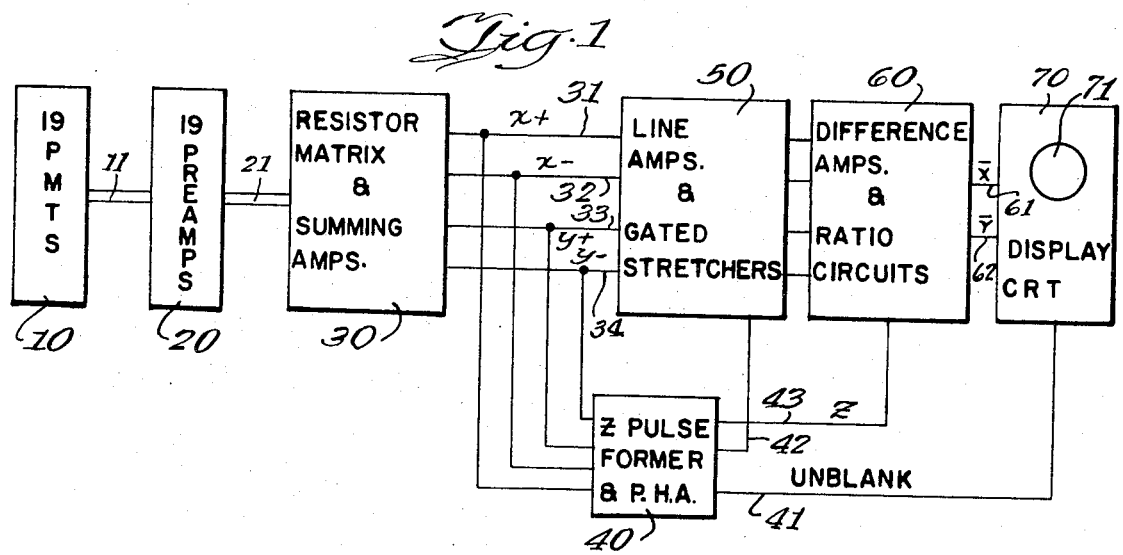
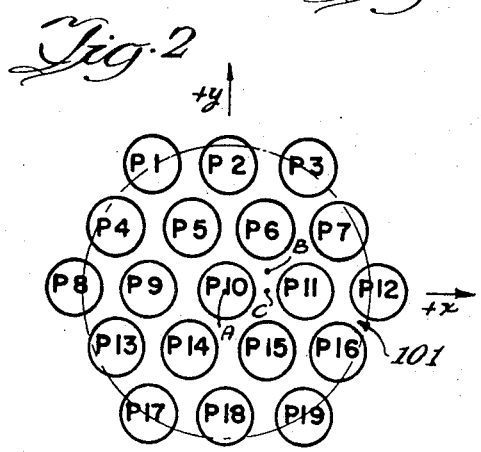
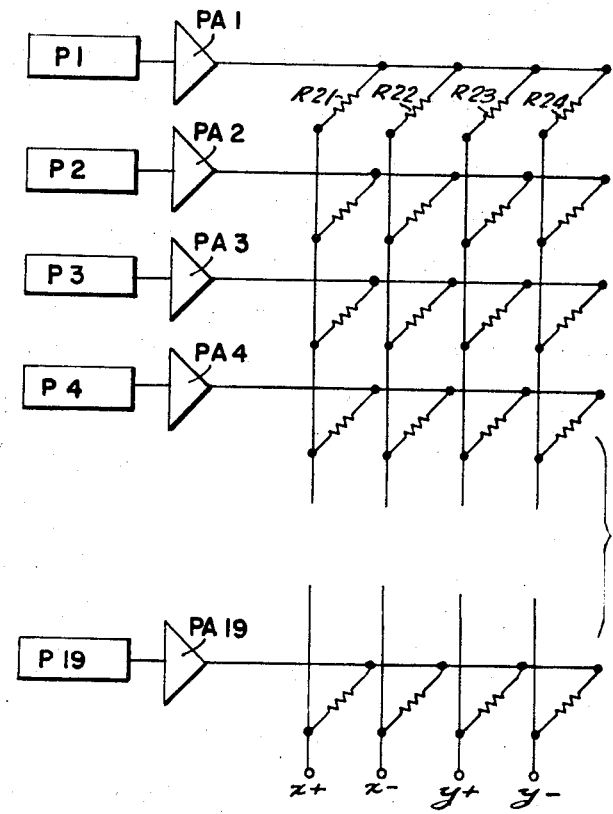
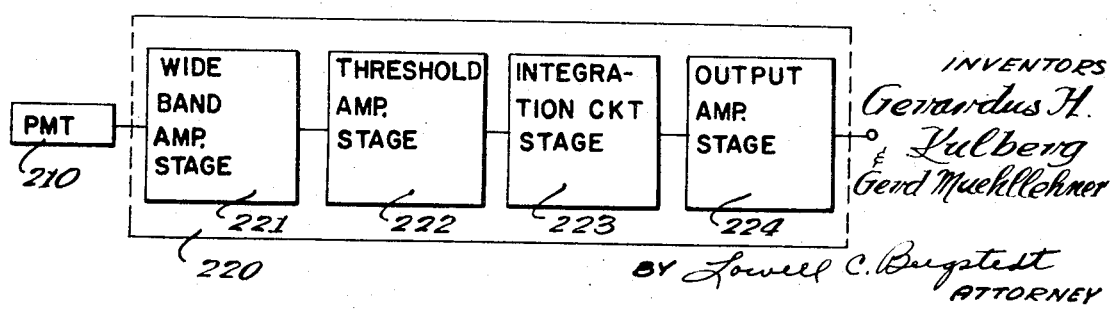

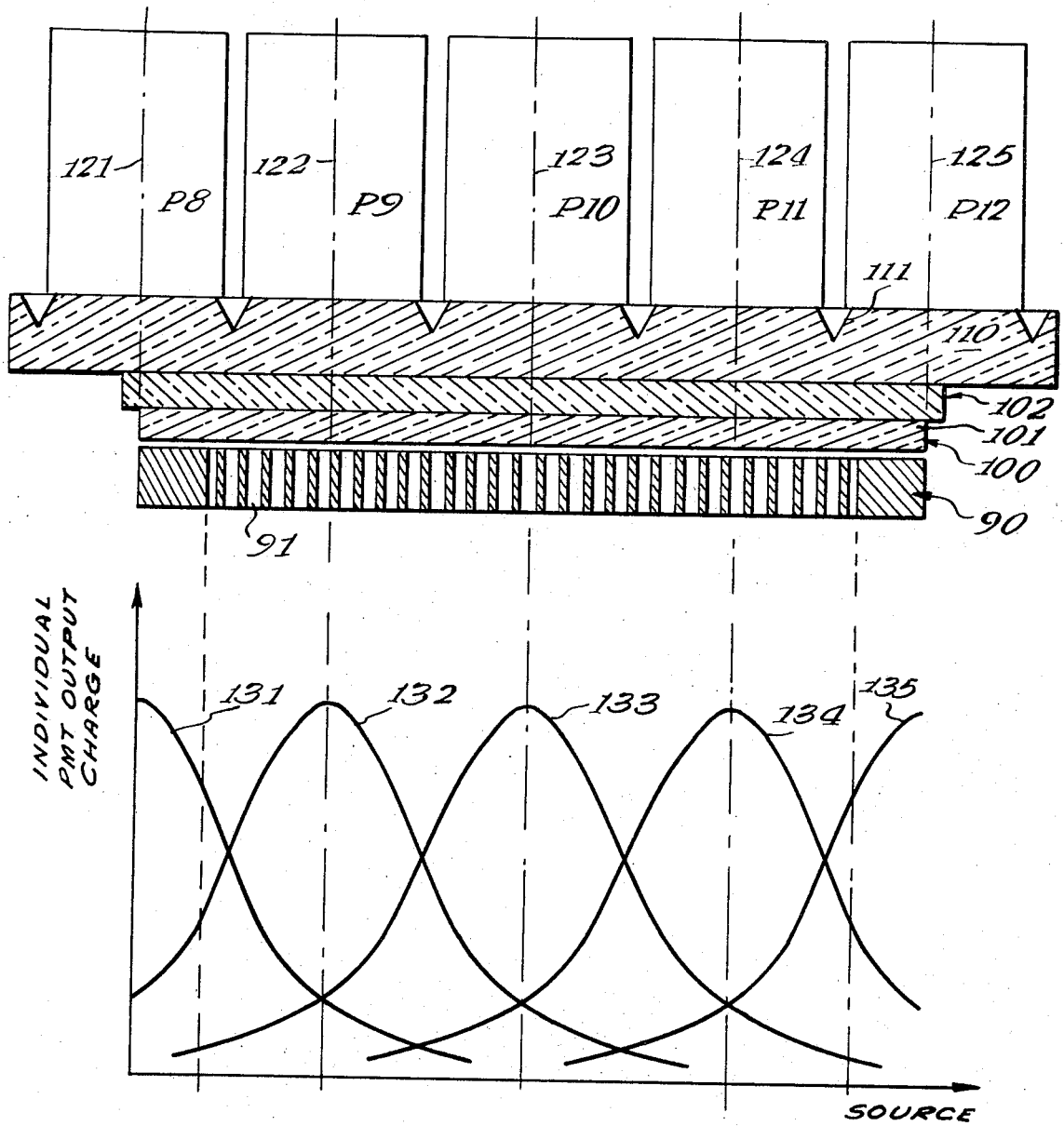

SCINTILLATION CAMERA WITH IMPROVED RESOLUTION

Scintillation cameras are in use in large number of nuclear medicine departments of hospitals throughout the world. The most widely used scintillation camera is a commercial version of the Anger-type scintillation camera described in U.S. Pat. No. 3,011,057 and in the many articles published on this device within the last 10 years. The scintillation camera is able to take rapidly a "picture" of the distribution of radioactivity throughout an object under investigation, such as an organ of the human body which has taken up a diagnostic quantity of a radioactive isotope. A scintillation camera of the Anger-type produces a picture of the radioactivity distribution by detecting individual gamma rays emitted from the distributed radioactivity in the object and passing through a collimator to produce a scintillation in a thin planar scintillation crystal. The scintillation is detected by a bank of individual photomultiplier tubes which view overlapping areas of the crystal, and appropriate electronic circuits translate the outputs of the individual photomultiplier tubes into $x$ and $y$ coordinate signals and a Z signal which indicates generally the energy of the scintillation event or whether it falls within a selected energy window. A picture of the radioactivity distribution in the object may be obtained by coupling the $x$, $y$ and Z signals to a cathode ray oscilloscope, where the individual scintillation events are displayed as small spots of light positioned in accordance with the coordinate signals, and integrating a large number of spots on photographic film. A relatively large number of scintillation events is required to make up the final picture of the radioactivity distribution.

It can be stated as a general proposition that the "resolution" of a scintillation camera refers to the degree of ability of the camera faithfully to reproduce the spatial distribution of the radioactivity which is within the field of view of the device. The overall resolution of a scintillation camera depends on the resolution of the collimator employed with the detector and the intrinsic resolution of the detector itself. The collimator most widely used with the scintillation camera is a multichannel collimator involving a large number of mutually spaced apertures in a body of material substantially opaque to gamma rays. The resolution of such collimators is dependent on the size of the apertures, the wall thickness or septal thickness between apertures and the axial length of the apertures themselves. In general it can be stated that the design of multichannel collimator requires a trade-off between resolution and efficiency due to the fact that it is generally desirable to use a relatively small dose of radioactive isotope in the clinical imaging situation. It can also be stated that the intrinsic resolution of the imaging detector itself is the most important limiting factor on the overall resolution of the scintillation camera. An improvement in the intrinsic resolution of the detector enables the useful employment of collimators of higher resolution and a consequent improvement in the overall resolution of the scintillation camera.

Since an Anger-type camera functions in a manner such that each scintillation event is treated on a one-event-at-a-time basis, the overall intrinsic resolution of the Anger camera detector is generally dependent on the ability of the detector to signal accurately the position coordinates of each scintillation event. Because there are many operations involved in the detection of each scintillation event and the signalling of its position coordinates, the accuracy involved in each of these operations determines to a large extent the overall accuracy or resolution of the scintillation camera. For example, a gamma ray interacting with the scintillation crystal produces a light flash with a statistical variance in the number of photons generated by the interaction; the distribution of such photons to the photocathodes of the photomultiplier tube has a statistical variance; the efficiency of the photomultiplier tubes in converting the incident light photons to an electrical signal involves a statistical variance; and the treatment of the photomultiplier tube output signal in the electronic circuitry for the final positioning of a light spot on the cathode ray tube involves statistical variances. Each of these individual steps in the overall imaging process can be considered a separate problem from the standpoint of improvement in resolution of the detecting device.

This invention is based on the discovery that, because of the statistical variances in the number of photons reaching photomultiplier tubes distant from the location of a scintillation event and in the resultant output signals from such tubes together with the long "lever arm" associated with such tubes, the use of the signal information from distant tubes actually degrades the intrinsic resolution of the Anger-type detector. In other words, the information contributed by the distant tubes is substantially less accurate than that contributed by near tubes because it is based on relatively few photons from the scintillation event. The error or inaccuracy is compounded by the long "lever arm" associated with the distant tubes. The result is that image resolution is degraded by the use of signals contributed by distant tubes in generating the final coordinate signal information. This invention thus features the employment at the output of each photomultiplier tube of circuit means for amplifying output signals in a non-linear fashion characterized, generally, in that larger output signals receive greater amplification than smaller output signals so that the relatively accurate signals contributed by photomultiplier tubes near each scintillation are enhanced over relatively inaccurate signals contributed by distant photomultiplier tubes, thereby to obtain the desired object of the invention — the improvement of the intrinsic resolution of the Anger-type detector.

In a preferred embodiment of this invention, this circuit means is a threshold preamplifier circuit which has an input-output transfer characteristic such that input signals of a magnitude smaller than a preselected threshold magnitude produce substantially no output signal and input signals of a magnitude greater than said preselected threshold magnitude produce an amplified output signal which is substantially proportional to the magnitude of the input signal above the threshold magnitude.

The improved resolution obtained in the preferred embodiment of this invention does not require any modification of the other electronic circuitry of the Anger-type camera. However, the implementation of the preferred embodiment in a present commercial version of the camera has been coupled with a change in the integration time constants in the unit to take advantage of some additional gain in resolution achieved by using more of the light generated in each scintillation event, i.e. allowing the circuitry to respond to the scintillation over a longer period of time. The invention enhances the general diagnostic capabilities of the Anger-type camera without forcing an expensive redesign of other aspects of the system. In addition the improvement can be employed in previously manufactured units by installing substitute pre-amplifiers and making other minor circuit changes.

Other objects, features, and advantages of this invention will be apparent from a consideration of the following detailed description in conjunction with the accompanying drawings in which:

FIG. 1 is a block schematic diagram of the electronics in an Anger-type scintillation camera;

FIG. 2 is a schematic diagram of an hexagonal arrangement of photomultiplier tubes in an Anger-type scintillation camera;

FIG. 3 is a partly-block and partly-circuit schematic diagram of a portion of an Anger-type scintillation camera;

FIG. 4 is a partly sectioned schematic side view of elements of a detector head of an Anger-type scintillation camera;

FIG. 5 is a graphical representation of the output signals from the photomultiplier tubes shown in FIG. 4 as a function of the location of a collimated gamma ray source on the x-axis of the detector;

FIG. 6 is a block schematic diagram of a threshold preamplifier in accordance with this invention;

Figure 8:
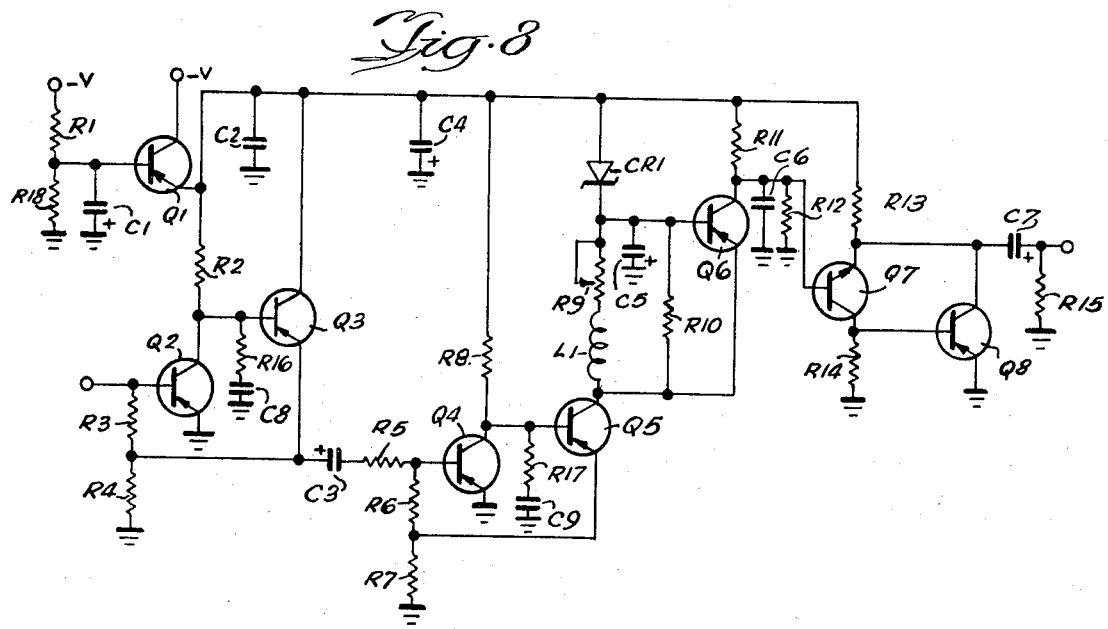
FIG. 8 is a circuit schematic diagram of a threshold preamplifier in accordance with this invention.

In FIG. 1 a block diagram of circuitry of a present commercial version of an Anger-type camera is shown. Nineteen photomultiplier tubes (PMTS) 10 function together to detect a scintillation and their 19 outputs 11 are separately coupled to 19 preamplifier circuits (PREAMPS) 20. Nineteen preamp outputs 21 are coupled to a resistor matrix and summing amplifier circuit 30, which develops, from the preamp outputs, four coordinate output signals $x+$, $x-$, $y+$, $y-$ on lines 31-34. These four output signals are fed to line amplifiers and gated stretchers 50 and to Z pulse former and pulse height analyzer (PHA) 40. The Z pulse former combines the four input signals into a Z signal which represents the energy of a scintillation event and is an input on line 43 to difference amplifiers and ratio circuits 60. The pulse height analyzer gates on the gated stretchers if the energy of a scintillation event falls within a selected energy window so that stretched $x+$, $x-$, $y+$, and $y-$ signals on lines 51-54 are presented to difference amplifiers and ratio circuits 60, where the $x+$ and $x-$ signals and $y+$ and $y-$ signals are subtracted and the results ratioed with the Z pulse as the denominator to produce $\bar{x}$ and $\bar{y}$ coordinate signals on lines 61 and 62. The pulse height analyzer also produces an unblanking signal on lead 41 as an input to a display CRT 70 when the analyzer has determined that a scintillation event falls within a selected energy window, and display CRT produces, upon unblanking, a spot of light on face panel 71 in accordance with input position coordinates $\bar{x}$ and $\bar{y}$.

In FIG. 2 a hexagonal array of 19 photomultiplier tubes P1-P19 as employed in a present commercial version of an Anger-type camera is shown schematically as the array would appear looking at it from the side opposite a scintillation crystal 101 which is viewed by the tubes. A $x, y$ coordinate system having origin at point A, the central axis of tube 10 is employed in this camera.

FIG. 3 shows in more detail the coupling of photomultiplier tubes P1-P19 through individual preamplifier circuits PA1-PA19 into a resistor matrix in which substantially all of the outputs from preamps PA1-PA19 are coupled through four weighting resistors, such as R21-R24, to four coordinate signal lines $x+$, $x-$, $y+$, $y-$. Tubes P8 and P12 respectively, have no resistor couplings to the $x+$ and $x-$ lines. The values of the weighting resistors are determined in accordance with the position of each tube in the $x, y$ coordinate system. FIG. 3 shows the matrixing approach used in a present commercial version of an Anger-type camera; however, other matrixing approaches using capacitors as impedance elements have been used by Anger and others. It should also be understood that the four line system shown in FIGS. 1 and 3 could be replaced by a five line system which involves a separate matrix for the energy or Z signal and a somewhat different approach to matrixing to develop $x+$, $x-$, $y+$, $y-$ signals. The Anger-type camera principles are essentially involved in the different approaches.

FIG. 4 shows schematically a cross-sectional view of the major functioning elements in a detector head of a present commercial version of an Anger-type camera. A collimator 90 of the multichannel type, i.e. with a larger number of channels 91, permits radiation quanta travelling essentially in the direction of the axes of the channels to pass while absorbing or blocking radiation incident at other angles. A crystal assembly 100 comprising a flat round disc 101 of thallium activated sodium iodide and a glass cover plate 102 receives radiation quanta passing through collimator 90. A quantum of radiation interacting with crystal 101 produces a light flash therein involving an isotropic release of photons. The number of photons is dependent on the energy given up by the radiation in the crystal; and if all the energy in the quantum is given up in producing a scintillation event, that event is known as a photopeak event. The pulse height selector of the camera is generally set to cause the camera to produce a final display of substantially only photopeak events according to the energy of the radioactive isotope employed. Most of the photons emitted in a scintillation event eventually reach one of the photocathodes of photomultiplier tubes P1-P19, some travelling directly through crystal 101, glass window 102, and light pipe 110, others after being reflected and/or refracted from various surfaces and interfaces in the assembly.

Grooves such as groove 111 are cut into light pipe 110 between photomultiplier tubes to direct light onto the photocathodes of the tubes. The apportionment of photons from each scintillation event is such that photomultiplier tubes near the coordinate location of the event receive a relatively large number of photons whereas distant tubes receive fewer photons.

FIG. 5 shows in graphical form the output response of five tubes P8–P12 on the x-axis of an Anger-type camera to a collimated gamma ray source at various locations on the x-axis. The curves 131-135 represent respectively the outputs from tubes P8–P12 in FIG. 4 and dashed lines 121-125 represent the central axes of these five tubes. From FIG. 5 it can be seen that a scintillation event occurring at point A in FIG. 2 will produce a very large output from tube P10, and smaller outputs from tubes P9 and P11, and very small outputs from P8 and P12. Because of the construction of the Anger-type detector and the matrixing employed, the average error in the output signals from tubes P8 and P12 is much larger than the average error in the output signals from tubes P9–P11 and the "lever arms" through which the outputs from P8 and P12 are applied is larger than the lever arms for tubes P9–P11 so the error is compounded. Thus, it has been discovered that the general accuracy of signalling the coordinates of an event at point A can be improved by eliminating the contributions of tubes P8 and P12 or enhancing the contributions made by the nearer tubes. Expanding this to the 19 tube array shown in FIG. 2, it will be seen that the improvement involves eliminating the contribution of all 12 tubes in the outer ring for scintillation events occurring at point A under tube 10, or otherwise enhancing the contribution of the seven central tubes.

A similar analysis can be made for point B which is equidistant from the centers of tubes P6, P10, and P11 and from tubes P5, P7, and P15. These six tubes will receive most of the photons from a scintillation event occurring at point B, and eliminating essentially the contribution of more distant tubes is found to improve generally the accuracy of signalling the coordinates of events occurring at point B. For events occurring at point C, tubes P10, P11, P6, and P15 receive most of the photons and contribute the most accurate information, while more distant tubes generally would contribute less accurate information.

In general, this invention involves the employment of circuit means at the output of each photomultiplier tube having a non-linear characteristic to enhance large signal outputs over small signal outputs, thereby enhancing the relatively more accurate signal information over the relatively less accurate signal information generated for each scintillation event. Others have recently sought to achieve somewhat this same end result by employing delay lines and time-to-pulse height converters instead of a matrix of impedances and summing amplifiers (see Tanaka et al., "Scintillation Cameras Based on New Position Arithmetics," Journal of Nuclear Medicine Vol. 11, No. 9, pp. 542–547, September, 1970). This other approach, although employing the basic Anger camera principle, involves a total redesign of the electronic circuitry, whereas this invention is immediately and directly adaptable to existing designs of commercial Anger-type camera systems. Essentially what is involved in a preferred embodiment of this invention is the employment of a different type of preamplifier in place of the type previously employed.

Figure 7:
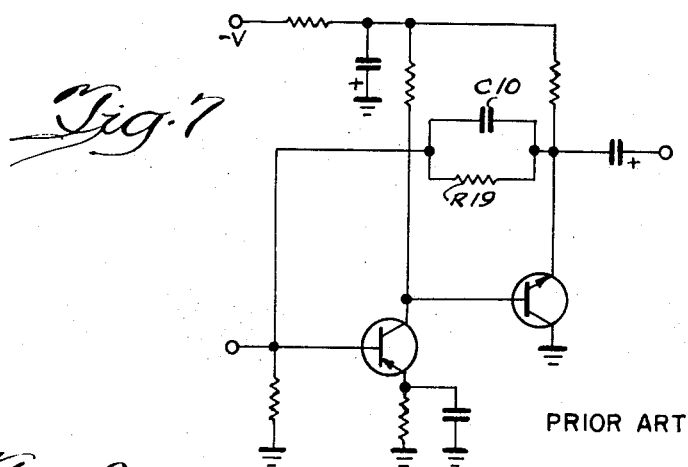
FIG. 7 is a circuit schematic diagram of a prior art type of preamplifier.
Figure 9:
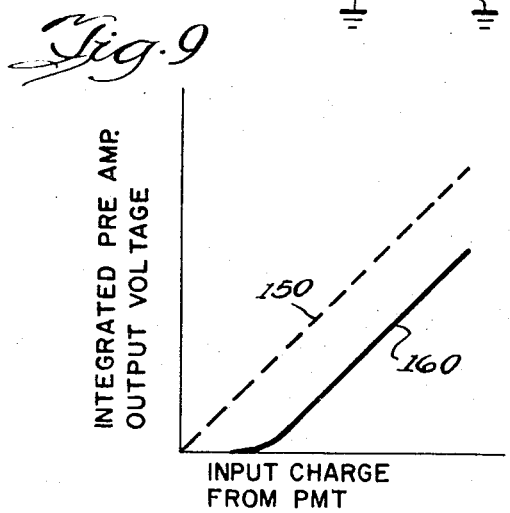
FIG. 9 is a graphical representation of the form of input-output transfer characteristics of a prior art preamplifier and a threshold preamplifier in accordance with this invention.

A block diagram of a preferred form of preamplifier in accordance with this invention is shown in FIG. 6. A photomultiplier (PMT) 210 is coupled to preamplifier 220 which comprises a wide band amplifier stage 221, a threshold amplifier stage 222, an integration circuit stage 223, and an output amplifier stage 224. Preamplifier 220 is employed at the output of each photomultiplier tube P1–P19 in FIG. 3 as preamps PA1–PA19. FIG. 7 shows a form of prior art preamplifier in which input signals of all magnitudes are linearly amplified and integrated by capacitor C10 and resistor R19 so that a characteristic output curve 150 as shown in FIG. 9 is obtained. Curve 160 in FIG. 9 shows the form of input-output characteristic of the type of threshold preamplifier shown in block form in FIG. 6. FIG. 8 shows the actual circuitry of a preferred form of threshold preamplifier for employment in a present commercial version of an Anger-type camera.

In FIG. 8 the wide band amplifier stage involves transistors Q2–Q5 and their associated biasing and coupling circuitry. The threshold amplifier stage involves transistor Q6 and its associated biasing circuitry including L1, R9, CR1, and R10. The integration circuit stage involves capacitor C6 and resistor R12; and the output amplifier stage involves transistors Q7 and Q8 and their associated circuit elements. Transistor Q1 and its associated circuit elements function as a power supply noise filter or isolation network. The circuit of FIG. 8 may be constructed with the following circuit elements and values:

TRANSISTORS
- Q1,Q3,Q4,Q5,Q6,Q8 — 2N3906
- Q2 — 2N4258
- Q7 — 2N3904

RESISTORS (ohms)
- R1 — 2K
- R2 — 10K
- R3 — 2K
- R4 — 220
- R5 — 332
- R6 — 2K
- R7 — 150
- R8 — 10K
- R9 — 100
- R10 — 15K
- R11 — 12K
- R12 — 100K
- R13 — 2.2K
- R14 — 1.8K
- R15 — 100K
- R16 — 56
- R17 — 56
- R18 — 18K CAPACITORS (microfarads)
- C1 — 15
- C2 — 0.1
- C3 — 15
- C4 — 15
- C5 — 15
- C6 — 0.002
- C7 — 15
- C8 — 0.100
- C9 — 0.047

INDUCTOR
- L1 — 10 MH

ZENER DIODE
- CR1 — 10V, 5%, ¼ watt

In more detail, the circuitry in FIG. 8 functions in the following manner. The wide band amplifier stage comprising transistors Q2–Q5 and associated circuit elements amplifies the output signal received from a photomultiplier tube. The series resistor-capacitor circuit combinations C8, R16 and C9, R17 are phase lag circuits which limit the bandwidth of this stage to about 20 megahertz to avoid amplification of high frequency noise. This bandwidth is sufficient, however, to handle the frequencies involved in pulses from a photomultiplier tube. Transistor Q6, in the threshold amplifier stage, operates in essentially a common base mode. Zener diode CR1 provides a 10 volt voltage drop from the −20 volt supply and fixes the bias on the base of transistor Q6. With a small signal on the collector of transistor Q5, current begins to flow through the low DC impedance of inductor L1 and resistor R9 and an increasing forward bias begins to build up in the base-emitter junction of transistor Q6. The input signal must, however, rise above a certain threshold value, selected by the setting of resistor R9, before heavy collector current is drawn in transistor Q6. Thus for small input signals below the selected threshold value, transistor Q6 will either remain in an OFF condition or only turn ON slightly to a bias point in the lower nonlinear portion of its characteristic curve. Input signals above the selected threshold value will produce an eventual base-emitter forward bias of a magnitude such that transistor Q6 is turned fully on and is operating in the linear portion of its characteristic curve.

The integration circuit stage comprising capacitor C6 and resistor R12 function in the usual manner to develop a voltage pulse of a height dependent upon the total charge delivered to the capacitor. The output amplifier stage involves essentially transistor Q7 connected in an emitter follower configuration with transistor Q8 providing added gain to achieve improved linearity for the final output signal.

Capacitors C2 and C4 provide additional power supply noise filtering. Capacitor C7 provides AC coupling of the output signal into the resistor matrix.

At present it has been determined that, at least for imaging gamma rays in the technetium-99m energy range (about 140 KEV), a threshold of about 5 percent of the maximum expected output signal from a photomultiplier tube should be used to achieve best results. The threshold can be set by first connecting a DC voltmeter to the collector of transistor Q6 and adjusting R9 until it is apparent that transistor Q6 is operating in the linear portion of its characteristic curve. Then an input signal pulse which produces a 100 millivolt output pulse is coupled into the preamplifier circuit. R9 is then adjusted until the output falls 5 millivolts.

Figure 10:
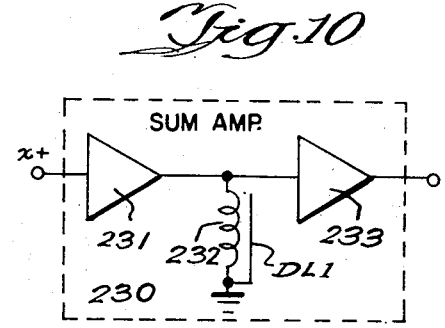
FIG. 10 is a schematic diagram of a summing amplifier used in a commercial version of an Anger-type scintillation camera.

It should again be emphasized that improved resolution is achieved without changing the resistor matrix or any other aspect of the system. At present the improvement in intrinsic spatial resolution of a present commercial version of an Anger-type camera employing the invention appears to be about 15 percent. An additional improvement of about 10 percent has resulted from increasing the integration time constant in the preamplifier circuit to about 25 microseconds and increasing the delay magnitude of delay line DL1 (232) in each summing amplifier 230 as in FIG. 10 from 200 nanoseconds to 400 nanoseconds to provide a delay line clipping time of 800 nanosecond total. This results in use of more of the light from each scintillation event. The same change may be made in the Z pulse former.

It will be apparent that for each scintillation event, the threshold preamplifier circuits associated with photomultiplier tubes remote from the location of the event will prevent outputs from such photomultiplier tubes reaching the resistor matrix and contributing to the x+, x−, y+, y− signals and the Z signal as well. This results in somewhat of a loss of output signal magnitude which can be compensated for, as necessary, by increasing the high voltage to the photomultiplier tubes or making other uniform gain adjustments. It is important to understand, however, that the elimination of signal information in accordance with this invention instead of working a negative result, works a very positive result essentially without sacrifice of performance in other respects. This is due to the fact that signal information having a relatively high probability of significant error and also a strong relative effect on the final signal information is essentially eliminated to enhance the more accurate signal information.

It appears at present that, with a 5 percent threshold in the preamplifiers, photomultiplier tubes having central axes more than two phototube diameters from the location of a scintillation event will not contribute to the final position signal. However, the magnitude of the threshold does not appear to be extremely critical; and it is believed that, for any Anger-type camera design or operating characteristics, a simple, straight forward emperical approach of measuring resolution at various threshold settings can be used to determine a substantially optimum threshold value. It also seems that the invention is useful with almost any size of crystal and number of phototubes in an Anger-type detector, although the improvement is expected to be most noticeable in a larger camera with a crystal at least 10 inches in diameter and employing at least 19 photomultiplier tubes.

It should be understood that types of non-linear preamplifiers other than a threshold preamplifier could be usefully employed at the output of each photomultiplier tube to improve intrinsic resolution. The general characteristic of any such nonlinear preamplifier must be such that larger input signals receive greater amplification than smaller input signals. This characteristic is satisfied by devices that have a somewhat discontinuous characteristic curve such that small inputs produce no output up to a preselected input level and inputs above that level produce an output which begins at a stepped-up level rather than increasing substantially linearly from the threshold level.

The above description of a preferred embodiment of this invention is given by way of example only and it should be understood that numerous modifications could be made without departing from the spirit and scope of the invention as claimed in the following claims.

We claim:

1. Radiation imaging apparatus comprising a scintillating crystal and a bank of photomultiplier tubes viewing overlapping areas of said crystal, said crystal being in the form of a flat disc having a longest dimension at least as great as twice the diameter of said photomultiplier tubes, and at least three photomultiplier tubes being disposed along said longest dimension; and computing circuitry coupled to said photomultiplier tubes to compute the coordinates of a scintillation produced in said crystal by the interaction therewith of a quantum of radiation, including circuit means at the output of each photomultiplier tube for amplifying output signals from each photomultiplier tube in a non-linear fashion, characterized in that larger output signals receive greater amplification than smaller output signals, thereby enhancing the relatively accurate signal information contributed by photomultiplier tubes near each scintillation over the relatively inaccurate signal information contributed by distant photomultiplier tubes to improve the overall spatial resolution of said apparatus.

2. Apparatus as claimed in claim 1, wherein said circuit means comprises a threshold preamplifier circuit having an input-output transfer characteristic such that input signals of a magnitude smaller than a preselected threshold magnitude produce substantially no output signal and input signals of a magnitude greater than said preselected threshold magnitude produce an amplified output signal which is substantially proportional to the magnitude of the input signal above said threshold magnitude.

3. Apparatus as claimed in claim 2, wherein said threshold preamplifier circuit comprises a wide band amplifier stage, a threshold amplifier stage having a preselected threshold magnitude, an integration circuit stage, and an output amplifier stage.

4. Apparatus as claimed in claim 1, wherein said scintillating crystal comprises a flat round disc having a diameter of at least 6 inches; said bank of photomultiplier tubes comprises at least seven photomultiplier tubes of substantially 3-inch diameter arranged in a hexagonal array with one central tube and six peripheral tubes; and said circuit means comprises a threshold preamplifier circuit having an input-output transfer characteristic such that input signals of a magnitude smaller than a preselected threshold magnitude produce substantially no output signal and input signals of a magnitude greater than said preselected threshold magnitude produce an amplified output signal which is proportional to the magnitude of the input signal above said threshold magnitude.

5. Apparatus as claimed in claim 1, wherein said scintillating crystal comprises a flat round disc having a diameter of at least 10 inches; said bank of photomultiplier tubes comprises at least 19 photomultiplier tubes arranged in a hexagonal array with a central tube, a first hexagonal arrangement of six tubes surrounding said central tube and a second hexagonal arrangement of twelve tubes surrounding said first hexagonal arrangement, and said circuit means comprises a threshold preamplifier circuit having an input-output transfer characteristic such that photomultiplier tubes remote from the location of a scintillation substantially do not contribute signal information to said computing circuitry.

6. Apparatus as claimed in claim 5, wherein said threshold preamplifier has a threshold magnitude equal to about 5 percent of the maximum expected output signal from a photomultiplier tube directly above a scintillation in said crystal.

7. Radiation imaging apparatus comprising a flat round disc of scintillating crystal having a diameter of at least 6 inches; a bank of photomultiplier tubes comprising at least seven tubes arranged in a hexagonal array and viewing overlapping areas of said crystal; a plurality of threshold preamplifier circuits, one each coupled to the output of each said photomultiplier tube and having an input-output transfer characteristic such that input signals of a magnitude smaller than a preselected threshold magnitude produce substantially no output signal and input signals of a magnitude greater than said preselected threshold magnitude produce an amplified output signal proportional to the magnitude of the input signal above said threshold magnitude; and circuit means coupled to said preamplifier circuits for computing the position coordinates of a scintillation in said crystal.

8. Apparatus as claimed in claim 7, wherein said crystal has a diameter of at least 10 inches; said bank of photomultiplier tubes comprises at least 19 tubes arranged in a hexagonal array; and said threshold magnitude is selected such that photomultiplier tubes having central axes two phototube diameters from said scintillation substantially do not contribute signal information to said circuit means.

9. Apparatus as claimed in claim 7, wherein said crystal has a diameter of at least 10 inches; said bank of photomultiplier tubes comprises at least 19 tubes arranged in a hexagonal array; and said threshold magnitude is selected to be equal to about 5 percent of the maximum expected output signal from a photomultiplier tube directly above a scintillation in said crystal.

10. An Anger-type scintillation camera having a scintillating crystal and a bank of photomultiplier tubes viewing overlapping areas of said crystal and coordinate computing circuitry coupled to said photomultiplier tubes, wherein the improvement comprises a plurality of non-linear preamplification means each coupled to a corresponding photomultiplier tube for amplifying large signals from said corresponding photomultiplier tube a greater amount than small signals therefrom to enhance substantially the information contribution from photomultiplier tubes near each scintillation over that from distant photomultiplier tubes, thereby to improve the spatial resolution of said camera.

11. Apparatus as claimed in claim 10, wherein said non-linear preamplification means comprises a threshold preamplifier circuit having an input-output transfer characteristic such that input signals of a magnitude smaller than a preselected threshold magnitude produce substantially no output signal and input signals of a magnitude greater than said preselected threshold magnitude produce an amplified output signal proportional to the magnitude of the input signal above said threshold magnitude.

12. Apparatus as claimed in claim 11, wherein said threshold magnitude is selected such that photomultiplier tubes having central axes two phototube diameters or more distant from a scintillation substantially do not contribute to the coordinate signal information.

13. Apparatus as claimed in claim 11, wherein said threshold magnitude is selected to be equal to about 5 percent of the maximum expected output signal from a photomultiplier tube directly above a scintillation in said crystal.

* * * * *